United States Patent
Sohma

(10) Patent No.: US 8,836,300 B2
(45) Date of Patent: Sep. 16, 2014

(54) STEP-DOWN SWITCHING REGULATOR

(75) Inventor: Shohtaroh Sohma, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 12/990,678

(22) PCT Filed: May 7, 2009

(86) PCT No.: PCT/JP2009/058963
§ 371 (c)(1),
(2), (4) Date: Nov. 2, 2010

(87) PCT Pub. No.: WO2009/139430
PCT Pub. Date: Nov. 19, 2009

(65) Prior Publication Data
US 2011/0043176 A1    Feb. 24, 2011

(30) Foreign Application Priority Data

May 13, 2008    (JP) .................................. 2008-125716

(51) Int. Cl.
*G05F 1/00*      (2006.01)
*H02M 3/158*     (2006.01)
*H02M 1/00*      (2006.01)

(52) U.S. Cl.
CPC .... *H02M 3/1588* (2013.01); *H02M 2001/0006* (2013.01); *Y02B 70/1466* (2013.01)
USPC ......................................... 323/272; 323/282

(58) Field of Classification Search
USPC .......................... 323/222, 271, 272, 282–288; 363/79–82
See application file for complete search history.

(56) References Cited

U.S. PATENT DOCUMENTS

| | | | | |
|---|---|---|---|---|
| 5,959,442 | A  * | 9/1999 | Hallberg et al. | 323/282 |
| 7,098,639 | B2 * | 8/2006 | Natsume et al. | 323/282 |
| 7,145,316 | B1 * | 12/2006 | Galinski, III | 323/288 |

(Continued)

FOREIGN PATENT DOCUMENTS

| | | |
|---|---|---|
| JP | 7-222439   | 8/1995 |
| JP | 2004-173460 | 6/2004 |

(Continued)

OTHER PUBLICATIONS

International Search Report in PCT/JP2009/05963.

(Continued)

*Primary Examiner* — Adolf Berhane
*Assistant Examiner* — Yemane Mehari
(74) *Attorney, Agent, or Firm* — Cooper & Dunham LLP

(57) ABSTRACT

A step-down switching regulator includes a switching element performing switching in accordance with an input control signal to charge an inductor with an input voltage; a synchronous rectification element performing switching in accordance with an input control signal to discharge the inductor; a power supply circuit part generating and outputting a supply voltage; a capacitor connected to the connection of the switching element and the inductor; a first drive circuit part controlling the switching of the switching element in accordance with an input control signal; a second drive circuit part controlling the switching of the synchronous rectification element in accordance with another input control signal; and a control circuit part generating and outputting the control signals to the first and second drive circuit parts so that the predetermined constant voltage is output from an output terminal, wherein the second drive circuit part is supplied with power from the capacitor.

17 Claims, 5 Drawing Sheets

(56) References Cited

U.S. PATENT DOCUMENTS

| | | |
|---|---|---|
| 7,649,346 B2 | 1/2010 | Sohma |
| 7,679,348 B2 | 3/2010 | Sohma |
| 7,795,849 B2 | 9/2010 | Sohma |
| 2004/0100240 A1 | 5/2004 | Natsume et al. |
| 2007/0063678 A1 | 3/2007 | Yoshikawa |
| 2007/0182395 A1 | 8/2007 | Sakai et al. |
| 2007/0217698 A1 | 9/2007 | Son |
| 2008/0150508 A1 | 6/2008 | Sohma |
| 2009/0135632 A1 | 5/2009 | Sohma |
| 2010/0013447 A1 | 1/2010 | Furuse et al. |
| 2010/0181977 A1 | 7/2010 | Sohma |

FOREIGN PATENT DOCUMENTS

| | | | | |
|---|---|---|---|---|
| JP | 2004173460 A | * | 6/2004 | ............ H02M 3/155 |
| JP | 2005-304226 | | 10/2005 | |
| JP | 3775240 | | 3/2006 | |
| JP | 2006-141191 | | 6/2006 | |
| JP | 2007-74809 | | 3/2007 | |
| JP | 2007-244128 | | 9/2007 | |
| JP | 2007-252113 | | 9/2007 | |
| JP | 2007-259599 | | 10/2007 | |
| JP | 2008-92635 | | 4/2008 | |
| JP | 2008-161001 | | 7/2008 | |
| JP | 2009-33883 | | 2/2009 | |
| JP | 2009-131062 | | 6/2009 | |
| JP | 2009-278719 | | 11/2009 | |
| JP | 2009-278720 | | 11/2009 | |
| JP | 2010-28951 | | 2/2010 | |
| WO | WO2009/139249 | | 11/2009 | |
| WO | WO2009/139430 | | 11/2009 | |

OTHER PUBLICATIONS

Mar. 28, 2012 Korean official action (with English translation) in connection with a counterpart Korean patent application.

Murata, Katsuaki, et al., "A Self Turn-On Mechanism of the Synchronous Rectifier in a DC/DC Converter," Telecommunications Energy Conference, 2004; INTELEC 2004; 26$^{th}$ International, Sep. 19, 2004.

Data Sheet No. PD60147 rev.U, International Rectifier; www.irf.com; Mar. 23, 2005.

Japanese official action dated Oct. 9, 2012 in connection with corresponding Japanese patent application No. 2008-125716.

* cited by examiner

STEP-DOWN SWITCHING REGULATOR

TECHNICAL FIELD

The present invention relates generally to step-down switching regulators forming step-down DC-DC converters, and more particularly to a step-down switching regulator formed of a semiconductor that enables a high voltage metal-oxide semiconductor (MOS) transistor and a low voltage MOS transistor to be integrated onto a single chip.

BACKGROUND ART

In conventional switching regulators, in the case of a high input voltage, circuits are formed with transistors capable of withstanding voltages higher than the input voltage. However, such high voltage transistors are larger in size, lower in current driving capability, and lower in response speed than low voltage transistors, so that it is difficult to form high performance switching regulators with high voltage transistors.

Further, higher efficiency can be attained by using an n-channel MOS (NMOS) transistor, which has better characteristics than p-channel MOS (PMOS) transistors, for a switching element where the flowing current is largest among the elements of a switching regulator and that is required to operate at high speed.

However, in the case of using an NMOS transistor for the switching element of a step-down switching regulator, the drain of the NMOS transistor is connected directly to input voltage, and the source voltage increases to near the input voltage when the NMOS transistor turns on, so that the NMOS transistor needs a gate voltage higher than the input voltage in order to turn on.

In an attempt to solve this problem, such a method is provided that generates a voltage higher than or equal to an input voltage using a bootstrap capacitor and performs on-off control of an NMOS transistor serving as a switching element using the generated voltage. (See, for example, Japanese Laid-Open Patent Application No. 7-222439 and Japanese Patent No. 3775240.)

However, even if an NMOS transistor is used for the switching element, using high voltage transistors for all the transistors of the switching regulator increases chip area and does not improve low response speed.

SUMMARY OF INVENTION

Embodiments of the present invention may solve or reduce one or more of the above-described problems.

According to one embodiment of the present invention, a step-down switching regulator is provided where one or more of the above-described problems may be solved or reduced.

According to one embodiment of the present invention, a step-down switching regulator is provided which high voltage can be input to and can be smaller in chip area and higher in response speed.

According to one embodiment of the present invention, there is provided a step-down switching regulator of a non-isolated type using an inductor, the step-down switching regulator including a plurality of high voltage and low voltage MOS transistors and being configured to reduce a voltage input to an input terminal to a predetermined constant voltage and to output the constant voltage from an output terminal, the input voltage being higher than or equal to withstand voltages of the low voltage MOS transistors and lower than withstand voltages of the high voltage MOS transistors, the step-down switching regulator including a switching element formed of an NMOS transistor, the switching element being configured to perform switching in accordance with a first control signal input to a gate thereof so as to charge the inductor with the input voltage; a synchronous rectification element formed of an NMOS transistor, the synchronous rectification element being configured to perform switching in accordance with a second control signal input to a gate thereof and to discharge the inductor in response to the switching element turning off to stop charging the inductor; a power supply circuit part configured to generate and output a predetermined supply voltage; a capacitor connected to a connection of the switching element and the inductor and having the supply voltage applied to an end thereof; a first drive circuit part configured to control the switching of the switching element in accordance with a third control signal input thereto; a second drive circuit part configured to control the switching of the synchronous rectification element in accordance with a fourth control signal input thereto; and a control circuit part configured to generate and output the third and fourth control signals to the first and second drive circuit parts, respectively, so that the predetermined constant voltage is output from the output terminal, wherein the second drive circuit part is configured to be supplied with power from the capacitor.

BRIEF DESCRIPTION OF DRAWINGS

Other objects, features and advantages of the present invention will become more apparent from the following detailed description when read in conjunction with the accompanying drawings, in which.

DESCRIPTION OF EMBODIMENTS

Next, a description is given, with reference to the accompanying drawings, of embodiments of the present invention.

[First Embodiment]

Figure 1:
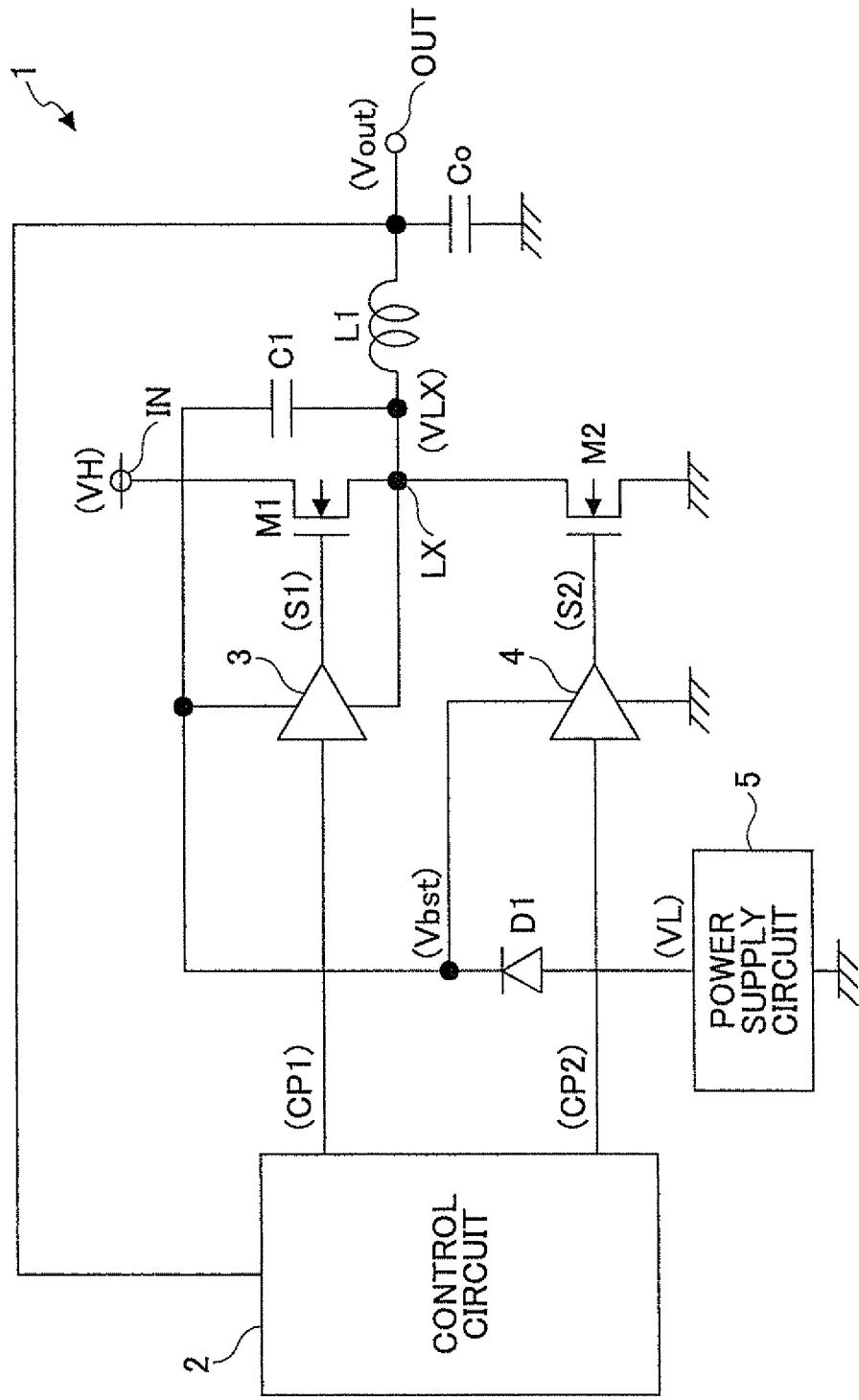
FIG. 1 is a diagram illustrating a circuit configuration of a step-down switching regulator according to a first embodiment of the present invention.

FIG. 1 is a diagram illustrating a circuit configuration of a step-down switching regulator according to a first embodiment of the present invention.

Referring to FIG. 1, a switching regulator 1 is a step-down switching regulator of a synchronous rectification type that converts a voltage VH input to an input terminal IN into a predetermined constant voltage and outputs the constant voltage from an output terminal OUT as an output voltage Vout. The switching regulator 1 is manufactured of a semiconductor where a high voltage MOS transistor and a low voltage MOS transistor are integrated onto a single (same) chip. Here, the "high voltage MOS transistor" refers to a MOS transistor that withstands a voltage higher than or equal to the input voltage VH, and the "low voltage MOS transistor" refers to a MOS transistor that has a higher drive capability than the high voltage MOS transistor and withstands a voltage lower than or equal to the input voltage VH.

The switching regulator 1 includes a switching transistor M1 formed of an NMOS transistor and a transistor for synchronous rectification (synchronous rectification transistor) M2 formed of an NMOS transistor. The switching transistor M1 performs a switching operation for controlling the output of the input voltage VH.

The switching regulator 1 further includes a control circuit 2 that generates and outputs a pulse signal CP1 and an inverted signal CP2, which is opposite in polarity (signal level) to the pulse signal CP1. The pulse signal CP1, which may be a pulse-width modulation (PWM) pulse signal for performing PWM control, controls the switching of the switching transistor M1 and the synchronous rectification transistor M2 so that the output voltage Vout is the predetermined constant voltage.

The switching regulator 1 further includes a first drive circuit 3, a second drive circuit 4, an inductor L1, an output capacitor Co, a power supply circuit 5, a bootstrap capacitor C1, and a diode D1. The first drive circuit 3, which includes a low voltage MOS transistor, forms a buffer circuit that performs on-off control of the switching transistor M1 in accordance with the pulse signal CP1 fed from the control circuit 2. The second drive circuit 4, which includes a low voltage MOS transistor, forms a buffer circuit that controls on-off control of the synchronous rectification transistor M2 in accordance with the inverted signal CP2 fed from the control circuit 2.

The switching transistor M1 may form a switching element, the synchronous rectification transistor M2 may form a synchronous rectification element, the first drive circuit 3 may form a first drive circuit part, the second drive circuit 4 may form a second drive circuit part, the power supply circuit 5 may form a power supply circuit part, and the control circuit 2 may form a control circuit part. Further, in the switching regulator 1, the circuits except for the inductor L1 and the output capacitor Co may be integrated into a single IC. In some cases, the circuits except for the switching transistor M1 and/or the synchronous rectification transistor M2, the inductor L1, and the output capacitor Co may be integrated into a single IC.

The input voltage VH is lower than or equal to the withstand voltage of the high voltage MOS transistor and is higher than or equal to the withstand voltage of the low voltage MOS transistor. Accordingly, high voltage NMOS transistors are used for the switching transistor M1 and the synchronous rectification transistor M2. The switching transistor M1 and the synchronous rectification transistor M2 are connected in series between the input terminal IN and ground. The switching transistor M1 and the synchronous rectification transistor M2 are connected at a connection LX. The inductor L1 is connected between the connection LX and the output terminal OUT. The output capacitor Co is connected between the output terminal OUT and ground.

The power supply circuit 5 generates and outputs a predetermined supply voltage VL, which is lower than the withstand voltage of the low voltage MOS transistor. The supply voltage VL is input to the positive power input of each of the first drive circuit 3 and the second driver circuit 4 through the diode D1. The supply voltage VL may form a first supply voltage. The bootstrap capacitor C1 is connected between the cathode of the diode D1 and the connection LX. The negative power input of the first drive circuit 3 is connected to the connection LX, and the negative power input of the second drive circuit 4 is grounded. The pulse signal CP1 fed from the control circuit 2 is input to the input of the first drive circuit 3. The output of the first drive circuit 3 is connected to the gate of the switching transistor M1. Further, the inverted signal CP2 fed from the control circuit 2 is input to the input of the second drive circuit 4. The output of the second drive circuit 4 is connected to the gate of the synchronous rectification transistor M2.

Figure 2:
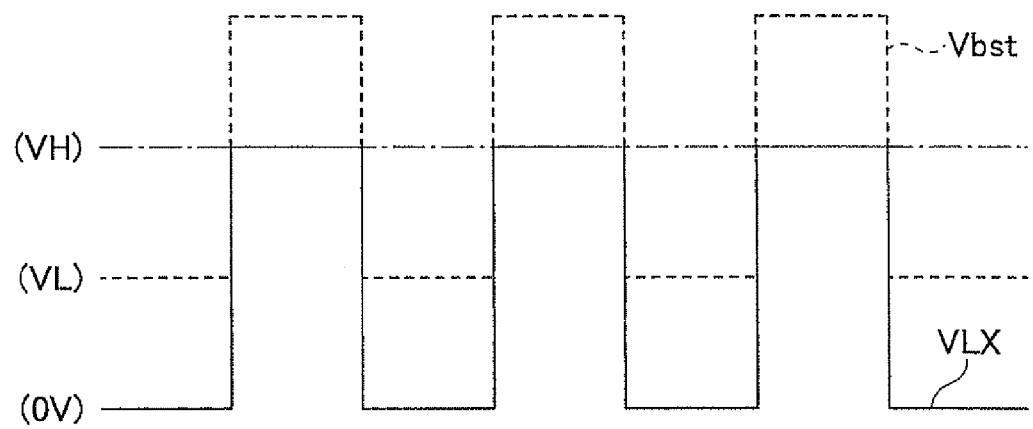
FIG. 2 is a waveform chart illustrating waveforms at points in the switching regulator 1 of FIG. 1 according to the first embodiment of the present invention.
Figure 2:
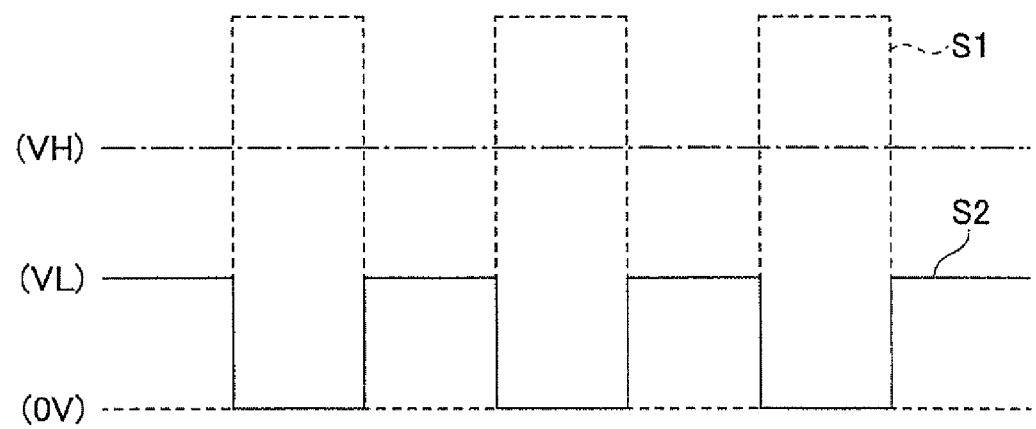

FIG. 2 is a waveform chart illustrating waveforms at points in the switching regulator 1 of FIG. 1 of the above-described configuration. A description is given, with reference to FIG. 2 as well as FIG. 1, of the operation of the switching regulator 1. The voltage input (applied) to the positive power input of each of the first drive circuit 3 and the second drive circuit 4 is denoted by Vbst.

When the output voltage Vout is 0 V, the bootstrap capacitor C1 is charged with the supply voltage VL from the power supply circuit 5 through the diode D1. The voltage Vbst, which is the supply voltage VL minus the forward voltage of the diode D1, is applied between the positive power input and the negative power input of each of the first drive circuit 3 and the second drive circuit 4.

When the pulse signal CP1 becomes HIGH (high-level), the inverted signal CP2 becomes LOW (low-level), so that an output signal S1 of the first drive circuit 3 becomes HIGH and an output signal S2 of the second drive circuit 3 becomes LOW. As a result, the switching transistor M1 turns ON to be conducting and the synchronous rectification transistor M2 turns OFF to be non-conducting.

Therefore, a voltage VLX at the connection LX increases so that the output voltage Vout also increases through the inductor L1. At this point, the voltage Vbst at the end of the bootstrap capacitor C1 connected to the positive power input of each of the first drive circuit 3 and the second drive circuit 4 also increases to be higher than or equal to the supply voltage VL, so that the diode D1 is reverse-biased.

Therefore, power is supplied to the first drive circuit 3 and the second drive circuit 4 only from the bootstrap capacitor C1. As a result, it is possible to reduce the current supply capability of the power supply circuit 5. The voltage Vbst higher than the input voltage VH and the voltage VLX that has risen to the input voltage VH are input (applied) to the positive power input and the negative power input, respectively, of the first drive circuit 3. Therefore, a transistor that can withstand the difference between the voltage Vbst and the input voltage VH may be used for the first drive circuit 3, so that a low voltage MOS transistor can be used for the first drive circuit 3. As a result, it is possible to reduce chip area and to increase response speed.

Further, if the buffer forming the second drive circuit 4 is formed of two series-connected inverters each formed of a PMOS transistor and an NMOS transistor connected in series, the PMOS transistor turns OFF to be non-conducting and the NMOS transistor turns ON to be conducting in the subsequent-stage (second-stage) inverter connected to the gate of the synchronous rectification transistor M2. Therefore, even when the voltage Vbst input as the positive supply voltage is higher than the input voltage VH, a low voltage MOS transistor can be used for the NMOS transistor of the subsequent-stage inverter because the PMOS transistor of the subsequent-stage inverter is OFF and non-conducting.

On the other hand, in the first-stage inverter of the second drive circuit 4, the PMOS transistor turns ON to be conducting and the NMOS transistor turns OFF to be non-conducting. Therefore, even when the voltage Vbst input as the positive supply voltage is higher than the input voltage VH, a low voltage MOS transistor can be used for the PMOS transistor of the first-stage inverter because the NMOS transistor of the first-stage inverter is OFF and non-conducting.

As a result, it is possible to reduce chip area and to increase response speed.

Next, when the pulse signal CP1 becomes LOW, the inverted signal CP2 becomes HIGH, so that the output signal S1 of the first drive circuit 3 becomes LOW and the output signal S2 of the second drive circuit 3 becomes HIGH. As a result, the switching transistor M1 turns OFF to be non-conducting and the synchronous rectification transistor M2 turns ON to be conducting. Therefore, current is supplied from ground to the inductor L1 through the synchronous rectification transistor M2, so that the voltage VLX at the connection LX is lower by a voltage drop due to the synchronous rectification transistor M2, and the bootstrap capacitor C1 is again charged with the supply voltage VL through the diode D1.

In this case, the voltage Vbst substantially equal to the supply voltage VL and the voltage VLX substantially equal to ground voltage (ground potential) are input (applied) to the positive power input and the negative power input, respectively, of the first drive circuit 3. Therefore, a transistor that can withstand the supply voltage VL may be used for the first drive circuit 3, so that a low voltage MOS transistor can be used for the first drive circuit 3. As a result, it is possible to reduce chip area and to increase response speed.

Further, in the second drive circuit 4, the voltage Vbst substantially equal to the supply voltage VL and the ground voltage are input (applied) to the positive power input and the negative power input, respectively. As a result, it is possible to use a buffer configured as described above for the second drive circuit 4, so that it is possible to reduce chip area and to increase response speed.

Next, when the pulse signal CP1 becomes HIGH again, the output signal S1 of the first drive circuit 3 becomes HIGH and the output signal S2 of the second drive circuit 4 becomes LOW, so that the switching transistor M1 turns ON to be conducting and the synchronous rectification transistor M2 turns OFF to be non-conducting. As a result, the voltage VLX at the connection LX increases, and the operation as described above is thereafter repeated.

Figure 3:
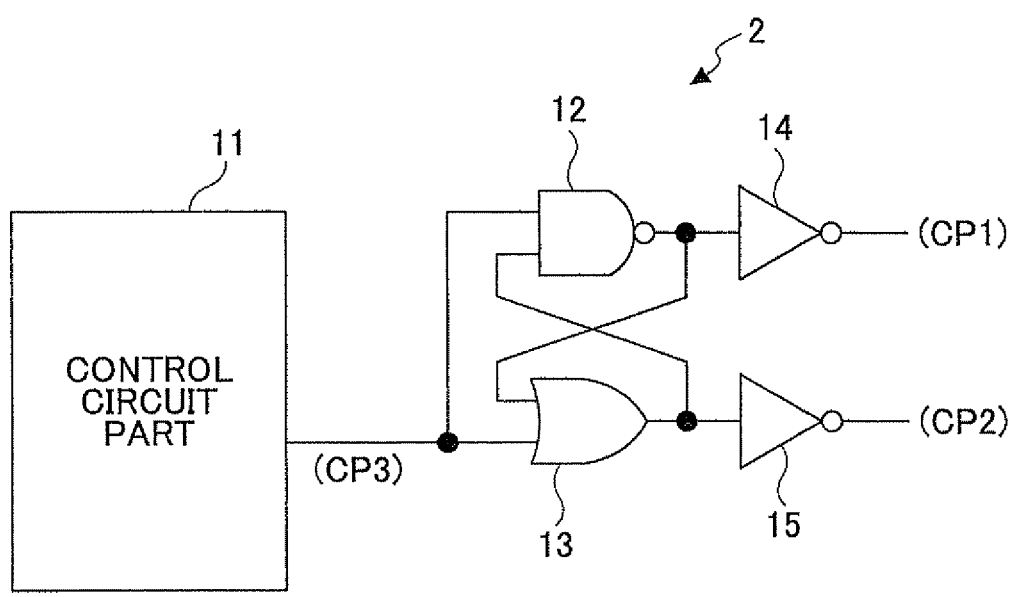
FIG. 3 is a diagram illustrating a circuit configuration of a control circuit of FIG. 1 according to the first embodiment of the present invention.

Here, the control circuit 2 may be configured as illustrated in FIG. 3.

Referring to FIG. 3, the control circuit 2 includes a control circuit part 11, a NAND circuit 12, an OR circuit 13, and inverters 14 and 15. The control circuit part 11 generates and outputs a pulse signal CP3, which is, for example, a PWM pulse signal for performing PWM control. The logic circuit formed by the NAND circuit 12, the OR circuit 13, and the inverters 14 and 15 generates the pulse signal CP1 and the inverted signal CP2 from the pulse signal CP3, and outputs the generated pulse signal CP1 and inverted signal CP2.

The pulse signal CP3 is input to one of the inputs of each of the NAND circuit 12 and the OR circuit 13. The output of the NAND circuit 12 is connected to the other input of the OR circuit 13, and the output of the OR circuit 13 is connected to the other input of the NAND circuit 12. The output of the NAND circuit 12 is also connected to the input of the inverter 14, and the pulse signal CP1 is output (fed) from the output of the inverter 14. Further, the output of the OR circuit 13 is also connected to the input of the inverter 15, and the inverted signal CP2 is output (fed) from the output of the inverter 15.

When the pulse signal CP3 becomes HIGH, the inverted signal CP2 becomes LOW, and thereafter, the pulse signal CP1 becomes HIGH. When the pulse signal CP3 becomes LOW, the pulse signal CP1 becomes LOW, and thereafter, the pulse signal CP2 becomes HIGH. Therefore, it is after the level at the connection LX becomes LOW that the output signal S2 of the second drive circuit 4 becomes HIGH, and it is before the level at the connection LX becomes HIGH that the output signal S2 becomes LOW. Therefore, the output of the second drive circuit 4 is prevented from exceeding the withstand voltage of the above-described NMOS transistor forming the low-side switch, which is a low voltage MOS transistor.

Figure 4:
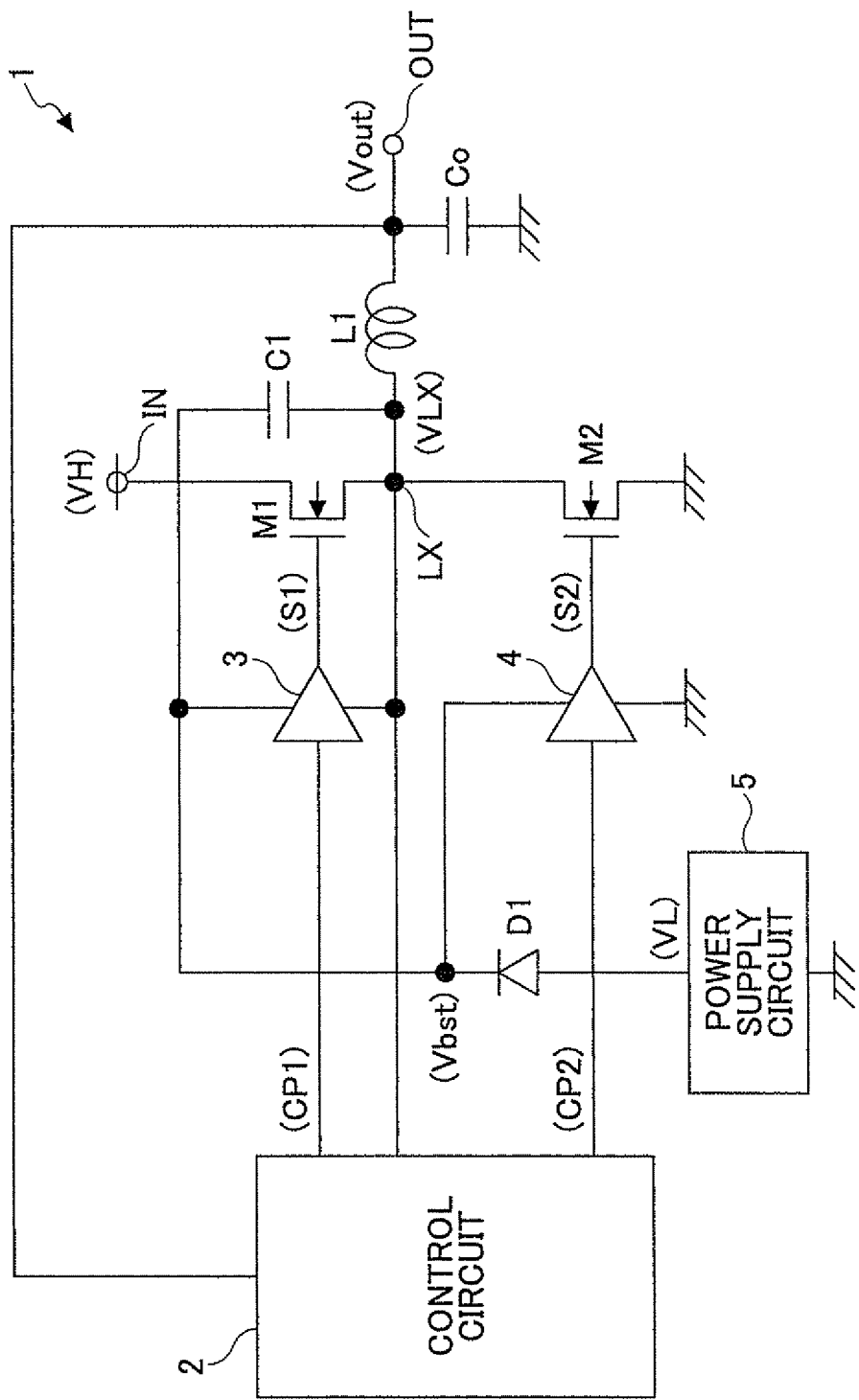
FIG. 4 is a diagram illustrating another circuit configuration of the step-down switching regulator according to the first embodiment of the present invention.

FIG. 4 is a diagram illustrating another circuit configuration of the step-down switching regulator 1 according to the first embodiment.

As illustrated in FIG. 4, the control circuit 2 may generate the pulse signal CP1 and the inverted signal CP2 in accordance with the voltage VLX.

Figure 5:
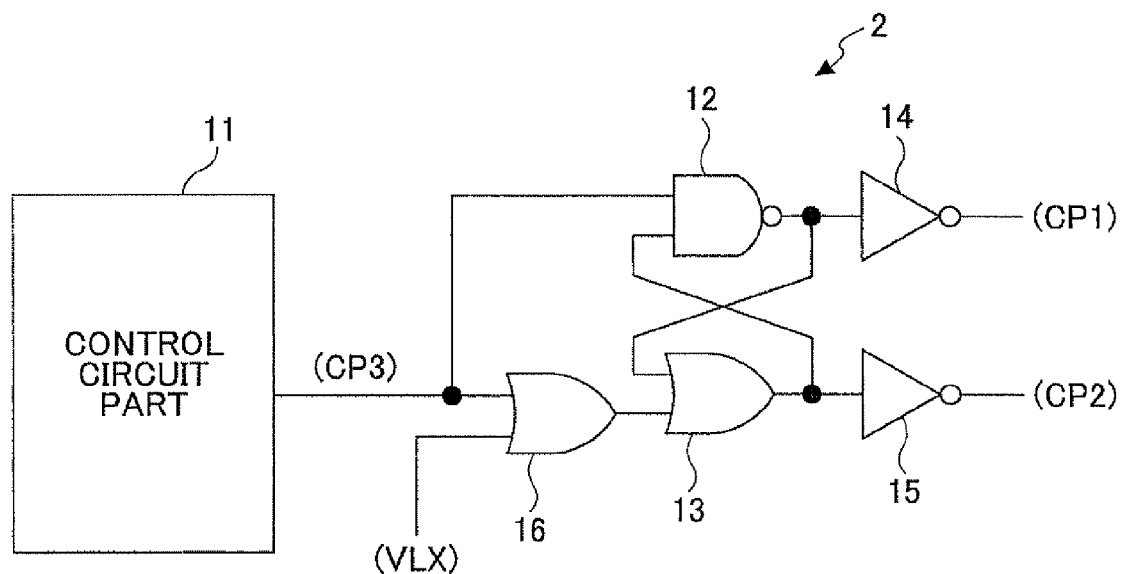
FIG. 5 is a diagram illustrating a circuit configuration of the control circuit of FIG. 4 according to the first embodiment of the present invention.

FIG. 5 is a diagram illustrating a circuit configuration of the control circuit 2 illustrated in FIG. 4. In FIG. 5, the same elements as or similar elements to those of FIG. 3 are referred to by the same reference numerals, and a description thereof is omitted.

Referring to FIG. 5, the control circuit 2 further includes an OR circuit 16 in addition to the control circuit 2 of FIG. 3.

Referring to FIG. 5, the control circuit 2 includes the control circuit part 11, the NAND circuit 12, the OR circuits 13 and 16, and the inverters 14 and 15. The logic circuit formed by the NAND circuit 12, the OR circuits 13 and 16, and the inverters 14 and 15 generates the pulse signal CP1 and the inverted signal CP2 from the pulse signal CP3 and outputs the generated pulse signal CP1 and inverted signal CP2. The pulse signal CP3 is input to one of the inputs of each of the NAND circuit 12 and the OR circuit 16. The voltage VLX is input (applied) to the other input of the OR circuit 16. The output of the OR circuit 16 is connected to one of the inputs of the OR circuit 13.

When the pulse signal CP3 becomes LOW, the pulse signal CP1 becomes LOW, so that the switching transistor M1 turns OFF to be non-conducting. When the switching transistor M1 turns OFF, the voltage VLX at the connection LX is lowered by the forward current of the inductor L1 so that the level of the connection LX becomes LOW. Thereafter, the inverted signal CP2 becomes HIGH so that the synchronous rectification transistor M2 turns ON to be conducting. Next, when the pulse signal CP3 becomes HIGH, the inverted signal CP2 becomes LOW, and thereafter, the pulse signal CP1 becomes HIGH. Accordingly, the output of the second drive circuit 4 is prevented from exceeding the withstand voltage of the above-described NMOS transistor forming the low-side switch, which is a low voltage MOS transistor. The configuration of FIG. 5 provides more safety than the configuration of FIG. 3 because the switching of the voltage VLX at the connection LX to low level is detected.

Thus, according to the step-down switching regulator 1 of the first embodiment, low-voltage MOS transistors can be used for the transistors of the first drive circuit 3 and some of the transistors of the second drive circuit 4 with a simple circuit, so that it is possible to reduce chip area and to increase response speed.

[Second Embodiment]

Figure 6:
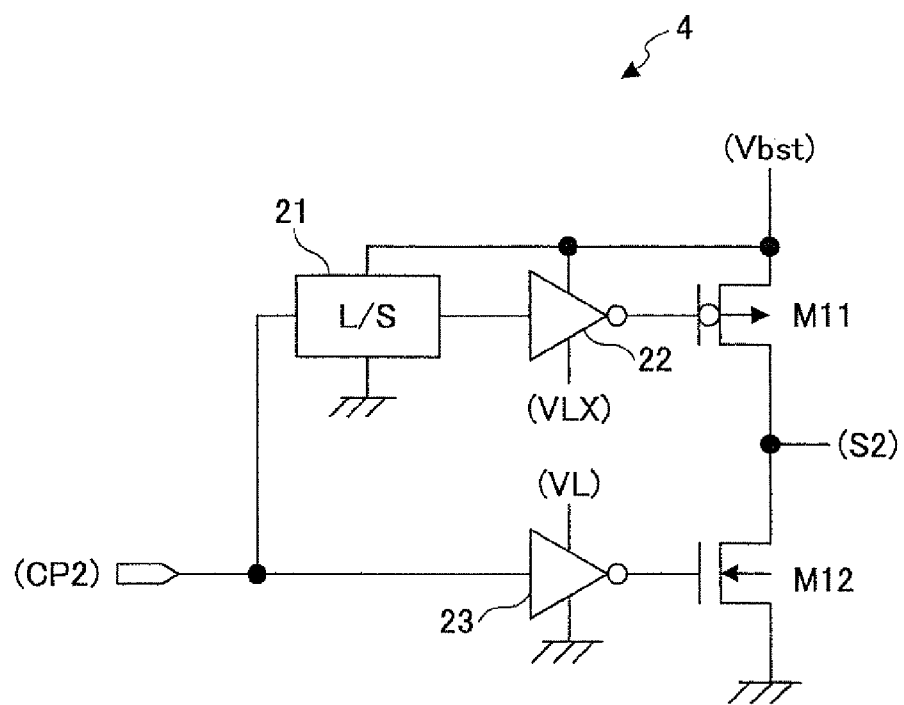
FIG. 6 is a diagram illustrating a circuit configuration of a second drive circuit of the step-down switching regulator according to a second embodiment of the present invention.

FIG. 6 is a diagram illustrating a circuit configuration of the second drive circuit 4 of a step-down switching regulator according to a second embodiment of the present invention. The step-down switching regulator of the second embodiment has the same circuit configuration as the step-down switching regulator 1 of the first embodiment illustrated in FIG. 1 except for the second drive circuit 4. Accordingly, a description of the step-down switching regulator of this embodiment is omitted except for the second drive circuit 4, and a circuit diagram of the step-down switching regulator of this embodiment is also omitted.

Referring to FIG. 6, the second drive circuit 4 includes a level shift circuit 21, inverters 22 and 23, a PMOS transistor M11, and an NMOS transistor M12.

The voltage Vbst and ground voltage are input (applied) to the positive power input and the negative power input, respectively, of the level shift circuit 21. The voltage Vbst and the voltage VLX are input (applied) to the positive power input and the negative power input, respectively, of the inverter 22. Further, the supply voltage VL and ground voltage are input (applied) to the positive power input and the negative power input, respectively, of the inverter 23. The inverted signal CP2 is input to the input of each of the level shift circuit 21 and the inverter 23. The output of the level shift circuit 21 is connected to the input of the inverter 22. The PMOS transistor M11 and the NMOS transistor M12 are connected in series between the voltage Vbst and ground. The output of the inverter 22 is connected to the gate of the PMOS transistor M11. The output of the inverter 23 is connected to the gate of the NMOS transistor M12. The connection of the PMOS transistor M11 and the NMOS transistor M12 forms the output of the second drive circuit 4.

In this configuration, the level shift circuit 21 performs level shifting on the inverted signal CP2 so that the inverted signal CP2 is converted into a pulse signal having an amplitude between the voltage Vbst and ground voltage, and outputs the pulse signal to the input of the inverter 22. This makes it possible to decrease the gate withstand voltage of the PMOS transistor M11 and further to reduce chip area and increase response speed.

Thus, according to the step-down switching regulator of the second embodiment, the same effects as in the first embodiment can be produced, and it is also possible to reduce chip area and increase response speed.

In the above-described first and second embodiments, the diode D1 may be replaced with a switch that is controlled to turn ON and OFF in the same manner as the diode D1 is forward-biased and reverse-biased.

Thus, according to one aspect of the present invention, in the step-down switching regulator 1, the power of the second drive circuit 4 that performs on-off control of the synchronous rectification transistor M2 is supplied from the bootstrap capacitor C1 having one end connected to the connection LX of the switching transistor M1 and the inductor L1 and having the other end supplied with the supply voltage VL. Therefore, part of the transistors of the second drive circuit 4, specifically, a MOS transistor for outputting a low-level signal, can be formed of a low voltage MOS transistor. Thus, with a simple circuit, it is possible to reduce chip area and increase response speed. Further, the second drive circuit 4 is supplied with power from the bootstrap capacitor C1 in place of an externally attached capacitor. Therefore, it is possible to reduce the number of externally attached components and the number of input/output terminals at the time of integration.

Further, according to one aspect of the present invention, the MOS transistor for outputting the low-level signal from an output circuit in the second drive circuit 4 is formed of a low voltage MOS transistor. Accordingly, it is possible to improve a current driving capability.

Further, according to one aspect of the present invention, the second drive circuit 4 includes the level shift circuit 21 that performs level shifting on the inverted signal CP2 (control signal) so as to convert the inverted signal CP2 into a signal having the amplitude of supply voltage supplied from the bootstrap capacitor C1 and outputs the converted signal to the gate of the high voltage MOS transistor of the output circuit. Therefore, the withstand voltage of the gate of the high voltage MOS transistor of the output circuit can be lower than those of other high voltage MOS transistors. Therefore, it is possible to reduce chip area and improve a drive capability.

Further, according to one aspect of the present invention, the synchronous rectification transistor M2 is configured to turn ON into a conducting state after detecting that the switching transistor M1 turns OFF into a non-conducting (interrupting) state. Therefore, it is possible to prevent the second drive circuit 4 from malfunctioning.

Further, according to one aspect of the present invention, the synchronous rectification transistor M2 is configured to turn ON into a conducting state by detecting that a voltage level at one end of the inductor L1 has become LOW in response to the switching transistor M1 turning OFF into a non-conducting state. Accordingly, it is possible to prevent the second drive circuit 4 from malfunctioning with more reliability.

Further, according to one aspect of the present invention, the first drive circuit 3 is configured to be supplied with power from the bootstrap capacitor C1 and is formed of one or more low voltage MOS transistors. Accordingly, it is possible to further reduce chip area and to further increase response speed.

The present invention is not limited to the specifically disclosed embodiments, and variations and modifications may be made without departing from the scope of the present invention.

The present application is based on Japanese Priority Patent Application No. 2008-125716, filed on May 13, 2008, the entire contents of which are incorporated herein by reference.

The invention claimed is:

1. A step-down switching regulator of a non-isolated type using an inductor, the step-down switching regulator including a plurality of high voltage and low voltage MOS transistors and being configured to reduce a voltage input to an input terminal to a predetermined constant voltage and to output the constant voltage from an output terminal, the input voltage being higher than or equal to withstand voltages of the low voltage MOS transistors and lower than withstand voltages of the high voltage MOS transistors, the step-down switching regulator comprising:

a switching element formed of an NMOS transistor, the switching element being configured to perform switching in accordance with a first control signal input to a gate thereof so as to charge the inductor with the input voltage;

a synchronous rectification element formed of an NMOS transistor, the synchronous rectification element being configured to perform switching in accordance with a second control signal input to a gate thereof and to discharge the inductor in response to the switching element turning off to stop charging the inductor;

a power supply circuit part configured to generate and output a predetermined supply voltage;

a capacitor connected to a connection of the switching element and the inductor and having the supply voltage applied to an end thereof;

a first drive circuit part configured to have an input terminal and a positive power input terminal and to control the switching of the switching element in accordance with a third control signal input to the input terminal of the first drive circuit part;

a second drive circuit part configured to have an input terminal and a positive power input terminal and to control the switching of the synchronous rectification element in accordance with a fourth control signal input to the input terminal of the second drive circuit part;

a control circuit part configured to generate and output the third and fourth control signals to the first and second drive circuit parts, respectively, such that the predetermined constant voltage is output from the output terminal; and a diode coupled to the power supply circuit part, wherein the positive power input terminal of the first drive circuit part is coupled to the positive input terminal of the second drive circuit part, and the supply voltage supplied by the power supply circuit part is input through the diode to the end of the capacitor, to the positive power input terminal of the first drive circuit part and to the positive power input terminal of the second drive circuit part, and wherein when the diode is reverse-biased, a voltage at the end of the capacitor is supplied to the positive power input terminal of the first drive circuit part and to the positive power input terminal of the second drive circuit part.

2. The step-down switching regulator as claimed in claim 1, wherein the predetermined supply voltage is lower than or equal to the withstand voltages of the low voltage MOS transistors.

3. The step-down switching regulator claimed in claim 2, wherein:
the second drive circuit part includes an output circuit configured to output the second control signal to the gate of the synchronous rectification element, and
the output circuit includes one of the high voltage MOS transistors to output a high-level signal and one of the low voltage MOS transistors to output a low-level signal.

4. The step-down switching regulator as claimed in claim 3, wherein the second drive circuit part further includes a level shift circuit configured to perform level shifting on the input fourth control signal so as to convert the input fourth control signal into a signal having an amplitude of a supply voltage supplied from the capacitor, and to output the converted signal to a gate of the one of the high voltage MOS transistors in the output circuit.

5. The step-down switching regulator as claimed in claim 4, wherein the withstand voltage of the gate of the one of the high voltage MOS transistors in the output circuit is lower than the withstand voltages of the other high voltage MOS transistors.

6. The step-down switching regulator as claimed in claim 1, wherein:
the second drive circuit part includes an output circuit configured to output the second control signal to the gate of the synchronous rectification element, and
the output circuit includes one of the high voltage MOS transistors to output a high-level signal and one of the low voltage MOS transistors to output a low-level signal.

7. The step-down switching regulator as claimed in claim 6, wherein the second drive circuit part further includes a level shift circuit configured to perform level shifting on the input fourth control signal so as to convert the input fourth control signal into a signal having an amplitude of a supply voltage supplied from the capacitor, and to output the converted signal to a gate of the one of the high voltage MOS transistors in the output circuit.

8. The step-down switching regulator as claimed in claim 7, wherein the withstand voltage of the gate of the one of the high voltage MOS transistors in the output circuit is lower than the withstand voltages of the other high voltage MOS transistors.

9. The step-down switching regulator as claimed in claim 1, further comprising:
a switch circuit part configured to control a connection of the supply voltage and the capacitor by performing switching in accordance with a fifth control signal input thereto from the control circuit part.

10. The step-down switching regulator as claimed in claim 9, wherein:
the second drive circuit part includes an output circuit configured to output the second control signal to the gate of the synchronous rectification element, and
the output circuit includes one of the high voltage MOS transistors to output a high-level signal and one of the low voltage MOS transistors to output a low-level signal.

11. The step-down switching regulator as claimed in claim 10, wherein the second drive circuit part further includes a level shift circuit configured to perform level shifting on the input fourth control signal so as to convert the input fourth control signal into a signal having an amplitude of a supply voltage supplied from the capacitor, and to output the converted signal to a gate of the one of the high voltage MOS transistors in the output circuit.

12. The step-down switching regulator as claimed in claim 11, wherein the withstand voltage of the gate of the one of the high voltage MOS transistors in the output circuit is lower than the withstand voltages of the other high voltage MOS transistors.

13. The step-down switching regulator as claimed in claim 1, wherein the control circuit part is configured to turn on the synchronous rectification element into a conducting state after detecting that the switching element has turned off into a non-conducting state.

14. The step-down switching regulator as claimed in claim 13, wherein the control circuit part is configured to turn on the synchronous rectification element into the conducting state by detecting that a voltage level at an end of the inductor has become low in response to the switching element turning off into the non-conducting state.

15. The step-down switching regulator as claimed in claim t, wherein the first drive circuit part is configured to be supplied with the power from the capacitor and is formed of one or more of the low voltage MOS transistors.

16. The step-down switching regulator as claimed in claim 1, wherein the voltage output from the output terminal is inputted to the control circuit part.

17. The step-down switching regulator as claimed in claim 1, wherein the first drive circuit part further has a positive power input terminal, and the end of the capacitor is connected to both of the positive power input terminal of the first drive circuit part and the positive power input terminal of the second drive circuit part.

* * * * *